(12) United States Patent
Kita

(10) Patent No.: US 8,410,361 B2
(45) Date of Patent: Apr. 2, 2013

(54) ELECTRICAL JUNCTION BOX

(75) Inventor: Yukinori Kita, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 359 days.

(21) Appl. No.: 12/762,549

(22) Filed: Apr. 19, 2010

(65) Prior Publication Data

US 2010/0300722 A1 Dec. 2, 2010

(30) Foreign Application Priority Data

Jun. 2, 2009 (JP) ................................ 2009-133322

(51) Int. Cl.
*H01H 9/02* (2006.01)

(52) U.S. Cl. .......................................... 174/58; 220/3.2

(58) Field of Classification Search .................. 248/906; 174/58, 63; 220/3.2, 3.92, 3.94, 3.3; 200/293, 200/297

See application file for complete search history.

(56) References Cited

U.S. PATENT DOCUMENTS

| 5,837,938 A | 11/1998 | Sakamoto | |
|---|---|---|---|
| 6,923,660 B2 | 8/2005 | Takeuchi | |
| 6,956,172 B2 * | 10/2005 | Dinh | 174/58 |
| 7,476,807 B1 * | 1/2009 | Gretz | 174/58 |
| 7,709,733 B1 * | 5/2010 | Plankell | 174/50 |
| 8,076,578 B1 * | 12/2011 | Gretz | 174/57 |
| 8,157,116 B2 * | 4/2012 | Ejima | 220/3.2 |

FOREIGN PATENT DOCUMENTS

| JP | 7-230854 | 8/1995 |
|---|---|---|
| JP | 7-245489 | 9/1995 |
| JP | 11-113136 | 4/1999 |
| JP | 2000-295734 | 10/2000 |
| JP | 2002-34117 | 1/2002 |
| JP | 2004-96899 | 3/2004 |

* cited by examiner

*Primary Examiner* — Alfred J Wujciak
(74) *Attorney, Agent, or Firm* — Greenblum & Bernstein P.L.C.

(57) ABSTRACT

To provide an electrical junction box in which an electrical junction box body includes one casing and the other casing, the other casing is prevented from being lifted from the one casing, and a bracket can be attached to a peripheral wall portion of the other casing stably and strongly. One casing is fitted in the other casing. A peripheral wall portion of the other casing is provided on an outer peripheral surface with engagement lock portions. A bottom wall section of the one casing is exposed from an opening defined by the peripheral wall portion. A fitting projection portion is provided on the bottom wall section near the engagement lock portions. The bracket is mated with the engagement lock portions. The fitting projection portion is mated with a fitting recess provided in the bracket to attach the bracket to the other casing.

4 Claims, 6 Drawing Sheets

ELECTRICAL JUNCTION BOX

The present application claims priority under 35 U.S.C. §119 of Japanese Application No. 2009-133322, filed on Jun. 2, 2009, the disclosure of which is expressly incorporated by reference herein in its entirety.

TECHNICAL FIELD

This invention relates to an electrical junction box to be mounted on a motor vehicle or the like and more particularly relates to an electrical junction box including a bracket for fixing and supporting an electrical junction box body on a vehicle body panel or the like.

BACKGROUND ART

An electrical junction box to be mounted on a motor vehicle or the like contains a printed board and wiring members, such as bus bars, connectors, and fuses so that they can keep a good maintenance function and can be arranged efficiently in the box. Recently, an electrical junction box including various kinds of controlling devices has been proposed. Such an electrical junction box is installed in a suitable space obtained in a passenger room or an engine room. In this case, there are some electrical junction boxes in which a separate bracket is attached to an outer peripheral wall portion of an electrical junction box body and an electrical junction box body is fixed and supported through the bracket on a vehicle body panel or the like. Even if a shape of the box body is different from that of a fixing position, it is possible to commonly use the electrical junction box body, by separating the bracket from the electrical junction box body.

Generally, an electrical junction box includes a hollow electrical junction box body formed by assembling a pair of casings. That is, one casing (inner casing) is superimposed on the other casing (outer casing) and an outer periphery of the one casing is covered with a peripheral wall portion of the other casing. As disclosed in Patent Document 1 (JP 2004-96899 A), the peripheral wall portion of the other casing is provided with an engagement lock portion. The bracket is attached to the engagement lock portion.

However, since the bracket is fixed on only the peripheral wall portion of the other casing of the electrical junction box body in the conventional electrical junction box disclosed in Patent Document 1, it was difficult to obtain a sufficient strength in a connecting part between the bracket and the box body. That is, when a great external force is applied to the electrical junction box, a load will be concentrated on the peripheral wall portion of the other casing to which the bracket is attached. Consequently, the peripheral wall portion of the other casing is likely to be deformed so that the peripheral wall portion is removed from the one casing and is bulged outward. The peripheral wall portion of the other casing is broken by the deformation, the bracket is loosened at the attaching portion on the electrical junction box body by the deformation, the assembling condition between the pair of casings constituting the electrical junction box body become unstable by the deformation, or internal circuits are affected by the deformation.

As disclosed in Patent Document 1, it may be considered to prevent the peripheral wall portion of the other casing from being lifted from the outer periphery of the one casing by locking the engagement projection portion protruding from the outer periphery of the one casing onto the peripheral wall portion of the other casing. However, this structure cannot obtain a sufficient strength, since the engagement projection portion is locked on the thin peripheral wall portion. In addition, the locking mechanism of the peripheral wall portion must dispose an engagement lock portion, on which the bracket is mounted, on a remote position. Accordingly, there is a problem that a space cannot be obtained in the case where a plurality of engagement lock portions are juxtaposed.

[Prior Technical Document]
[Patent Document]
   [Patent Document 1] JP 2004-96899 A

DISCLOSURE OF THE INVENTION

Problems that the Invention is to Solve

In view of the above problems, an object of the present invention is to provide an electrical junction box having a novelty structure in which an electrical junction box body includes one casing and the other casing, the other casing is prevented from being lifted from the one casing, and a bracket can be attached to a peripheral wall portion of the other casing stably and strongly.

Means for Solving the Problems

A first aspect of the present invention is directed to an electrical junction box wherein one casing is superimposed on the other casing, the one casing is fitted inside a peripheral wall portion provided on the other casing to form an electrical junction box body, an engagement lock portion is formed on an outer surface of the peripheral wall portion of the other casing, and a bracket is attached to the engagement lock portion. The electrical junction box is characterized in that: the peripheral wall portion of the other casing is provided on the outer surface with the engagement lock portion, a separate bracket is engaged with and attached to the engagement lock portion through an opening defined by the peripheral wall portion, a bottom wall section of the one casing is exposed from the opening defined by the peripheral wall portion of the other casing, a fitting projection portion protruding from the bottom wall section to an outer peripheral surface near the engagement lock portion is provided, and the bracket is provided with a fitting recess that is fitted in the fitting projection portion in association with coupling to the engagement lock portion and restrains the bracket from moving outward from the one casing.

According to the first aspect of the present invention, the bracket is secured to both one and other casings through the fitting projection portion and engagement lock portion. Thus, it is possible to disperse the external force applied to the bracket to both casings, to effectively enhance an attaching strength of the bracket, and to effectively maintain a stable attaching condition. Accordingly, it is possible to efficiently realize a mechanism for preventing the external force applied to the bracket from concentrating on the peripheral wall portion of the other casing by the single fitting projection portion.

In addition, the fitting projection portion is directly mated with the fitting recess in the bracket without interposing the other casing. Thus, it is possible to obtain a great attaching strength of the bracket to the electrical junction box body in spite of a strength of the peripheral wall portion of the other casing.

Furthermore, the fitting projection portion is provided on an edge portion between the bottom wall section and the side wall portion that have a great strength, and a high strength can be obtained in the fitting projection portion. By artfully utilizing the sufficient strength in the fitting projection portion, it is possible to enhance an attaching strength of the bracket to the other casing and further to effectively enhance a fixing force (restricting force) of the bracket on the one casing by the fitting projection portion.

Furthermore, the attaching direction of the bracket to the engagement lock portion is the same as that of the bracket to the fitting projection portion. Accordingly, it is possible to readily assemble the bracket on the engagement lock portion and fitting projection portion by a single operation.

A second aspect of the present invention is directed to a structure wherein, in the structure of the first aspect, an engagement lock portion includes two adjacent engagement lock parts in a peripheral direction, and the fitting projection portion is disposed between the two engagement lock parts in the peripheral direction.

According to the second aspect of the present invention, since it is possible to enhance the attaching strength of the bracket to the other casing by merely providing the fitting projection portion between the two engagement lock portions, it is possible to provide a plurality of engagement lock portions on a limited space and to obtain a high attaching strength of the bracket to the other casing.

A third aspect of the present invention is directed to a structure wherein, in the structure of the first or second aspect, the fitting projection portion includes a narrow width leg portion and a wide width head portion that extends in a fitting direction to the fitting recess in the bracket at a projecting end of the leg portion, and the leg portion projects to extend from an outer peripheral corner portion of the bottom wall section of the one casing to a bottom surface.

According to the third aspect of the present invention, for example, even if the side wall portion of the one casing that is exposed through the opening defined by the peripheral wall portion of the other casing is small, it is possible to set the effective length of the head portion of the fitting projection portion to be great. Consequently, it is possible to effectively enhance the fixing force (restricting force) of the bracket to the one casing by the fitting projection portion.

A fourth aspect of the present invention is directed to a structure wherein, in the structure of the third aspect, the bottom wall section is provided on a bottom surface with a reinforcing rib and the leg portion of the fitting projection portion is coupled to the reinforcing rib.

According to the fourth aspect of the present invention, it is possible to advantageously enhance the strength of the fitting projection portion. Consequently, it is possible to further effectively enhance the fixing force (restricting force) of the bracket to the one casing by the fitting projection portion.

Effects of the Invention

The electrical junction box in accordance with the present invention can restrain the other casing from being lifted from the one casing and can attach the bracket to the electrical junction box body strongly and stably with a simple structure and an excellent efficiency in space.

PREFERRED ASPECTS OF EMBODYING THE INVENTION

Figure 1:
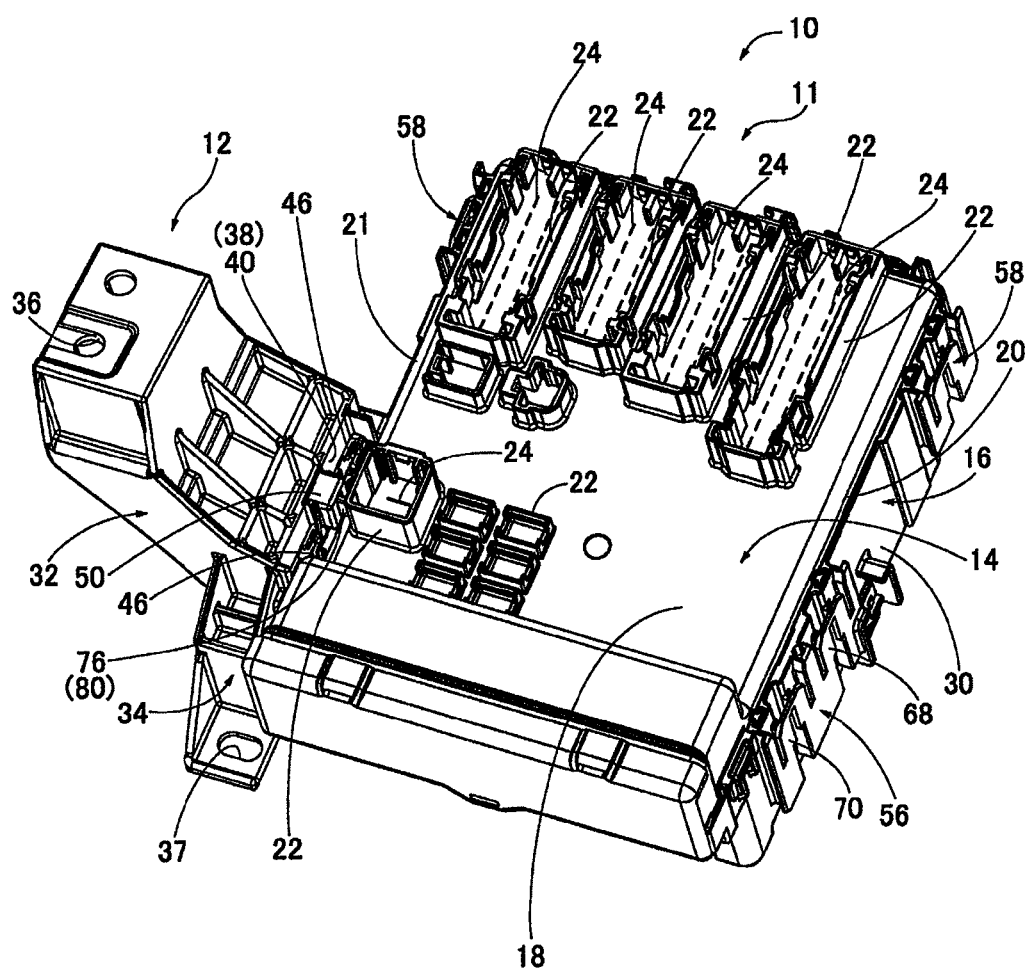
FIG. 1 is a perspective view of an embodiment of an electrical junction box in accordance with the present invention.

Referring now to the drawings, an embodiment of an electrical junction box in accordance with the present invention will be described below.

Figure 2:
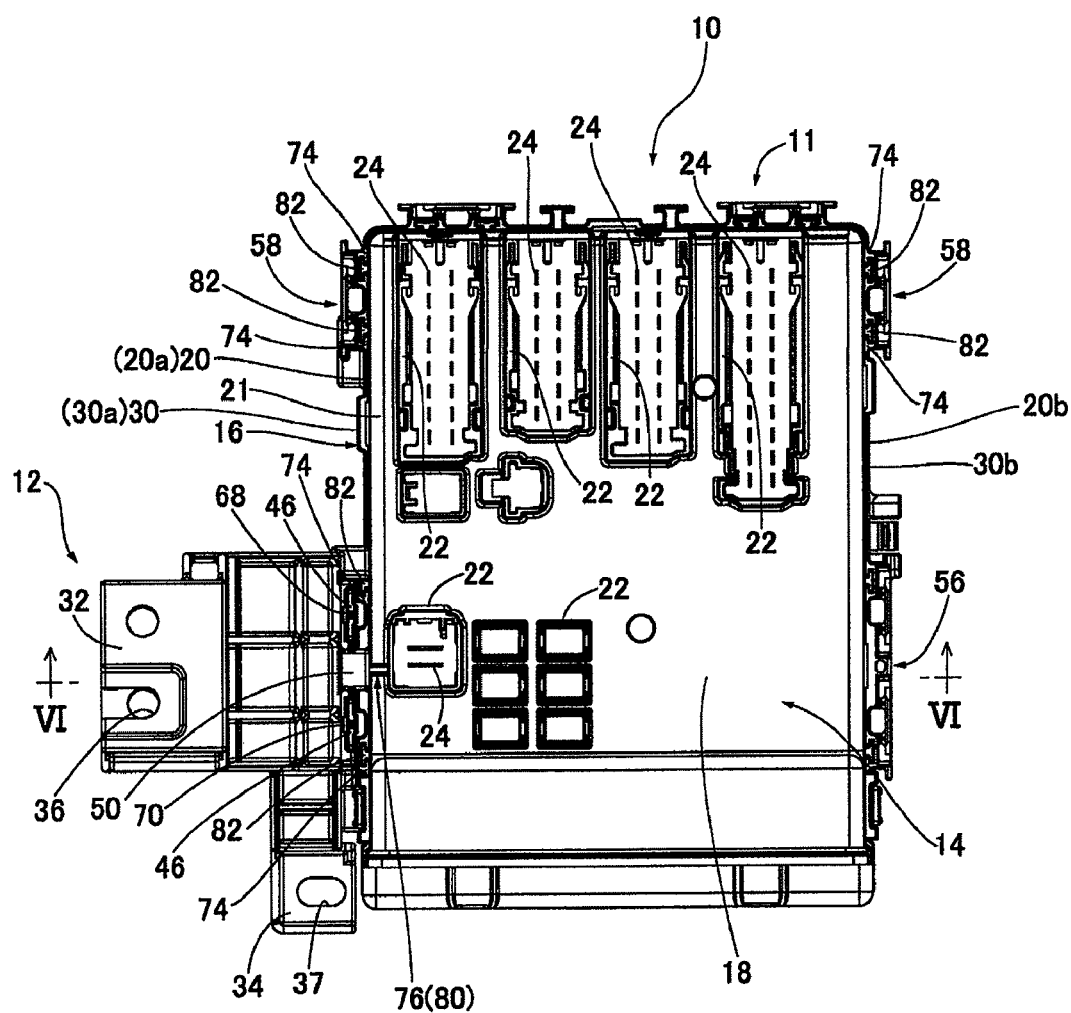
FIG. 2 is a top plan view of the electrical junction box shown in FIG. 1.

FIGS. 1 and 2 show an electrical junction box 10 in an embodiment of the present invention. The electrical junction box 10 includes an electrical junction box body 11 and a bracket 12 attached to the box body 11. The electrical junction box 10 is attached to a vehicle body panel (not shown) of a motor vehicle through the bracket 12.

Figure 3:
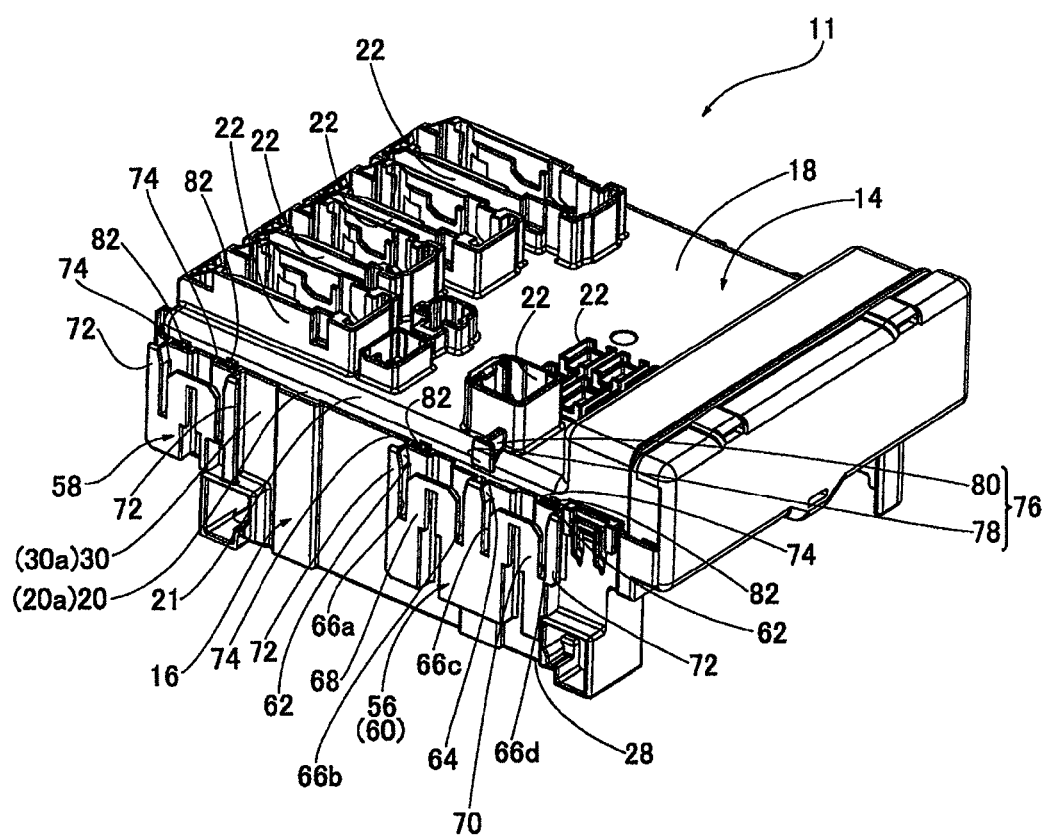
FIG. 3 is a perspective view of an electrical junction box body that constitutes the electrical junction box shown in FIG. 1, illustrating an assembled state of an inner casing and an outer casing.

In more detail, the electrical junction box body 11 includes an inner casing (one casing) 14 and an outer casing (the other casing) 16. As shown in FIGS. 1 to 3, the inner casing 14 is formed into a box-like configuration and is made of a synthetic resin material. The inner casing 14 includes a bottom wall section 18 having a substantially rectangular shape, and a peripheral wall portion 20 that projects from an outer peripheral edge of the bottom wall section 18 in a thickness direction of the bottom wall section 18 and extends continuously in a peripheral direction. The bottom wall section 18 and peripheral wall portion 20 are integrated with each other. For convenience of explanation, it should be noted hereinafter that a direction projecting from the bottom wall section 18 of the peripheral wall portion 20 in the inner casing 14 is designated as an upper and lower direction (a direction perpendicular to the paper sheet in FIG. 2), a longitudinal direction of the bottom wall section 18 is designated as a front and rear direction (an upper and lower direction in FIG. 2), and a width direction of the bottom wall section 18 is designated as a right and left direction (a right and left direction in FIG. 2).

The bottom wall section 18 of the inner casing 14 is provided on a top surface with a plurality of receiving tubular portions 22 that are integrated with the bottom wall section 18 and serve to contain connectors, relays, fuses and the like (not shown).

The outer casing 16 is formed into a box-like configuration and is made of a synthetic resin material. The outer casing 16 is slightly greater than the inner casing 14, as a whole. The outer casing 16 includes a bottom wall section 28 having a substantially rectangular shape, and a peripheral wall portion 30 that projects upward from an outer peripheral edge of the bottom wall section 28 and extends continuously in a peripheral direction. The bottom wall section 28 and peripheral wall portion 30 are integrated with each other.

The peripheral wall portion 20 of the inner casing 14 is fitted through an upper side opening in the outer casing 16 inside the peripheral wall portion 30 of the outer casing 16. Thus, an outer surface of the peripheral wall portion 20 of the inner casing 14 is superimposed on an inner surface of the peripheral wall portion 30 of the outer casing 16. The upper side opening in the outer casing 16 is closed by the bottom wall section 18 of the inner casing 14. The inner and outer casings 14 and 16 are assembled to each other to form the electrical junction box body 11. When the inner and outer casings 14 and 16 are combined with each other, the whole bottom wall section 18, a proximal end part of the peripheral wall portion 20, and an outer peripheral wall corner portion 21 formed between them in the inner casing 14 are projected upward and exposed outward from the upper side opening in the peripheral wall portion 30 of the outer casing 16.

Wiring members (not shown) such as printed boards and bus bars are contained in the electrical junction box body 11. Some parts of the wiring members can be coupled to external members via through-holes 24 in the receiving tubular sections 22 projecting from the bottom wall section 18 of the inner casing 14. The wiring members are electrically coupled to electrical components mounted on the receiving tubular sections 22 or the wiring members are electrically coupled to external electrical components through connectors mounted on the receiving tubular sections 22.

Figure 4:
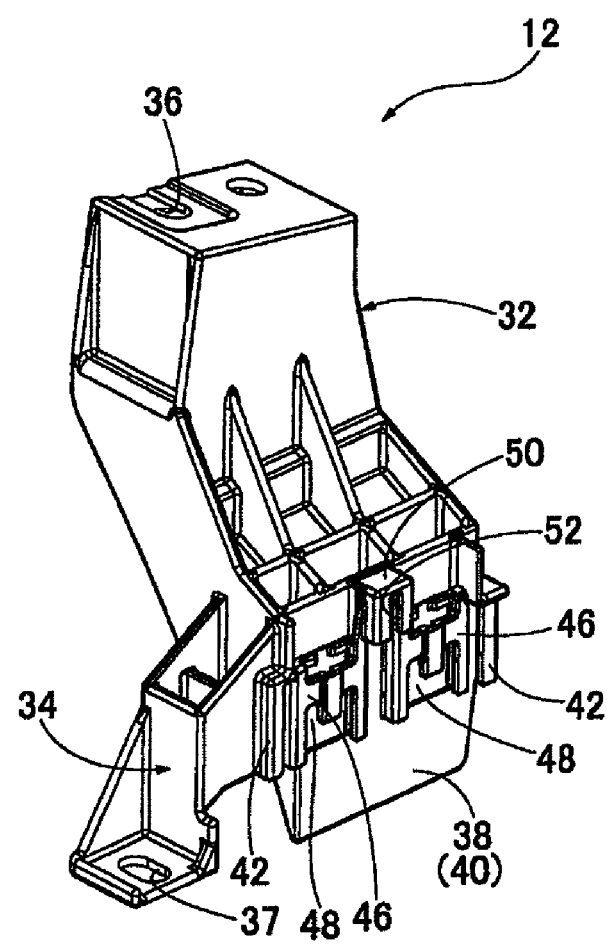
FIG. 4 is a perspective view of a bracket that constitutes the electrical junction box shown in FIG. 1.

On the other hand, the bracket 12, as shown in FIG. 4, includes a box-like bracket body 32 reinforced by a plurality of ribs and a fixing leg portion 34 projecting from a side wall of the bracket body 32. The body 32 and portion 34 are integrated with each other. The bracket 12 is made of a synthetic resin material and is separated from the electrical junction box body 11. The bracket body 32 is provided in an upper part with a bolt-receiving hole 36. When a fixing bolt (not shown) inserted into the bolt-receiving hole 36 is fastened onto the vehicle body panel, the bracket 12 is secured to the vehicle body panel. The fixing leg portion 34 is provided in a lower end portion with a clamping hole 37. A clamp mounted on a wire harness (not shown) is secured to the clamping hole 37.

The bracket 12 is attached to the electrical junction box body 11 by a special structure that has not been observed in the prior art.

Figure 5:
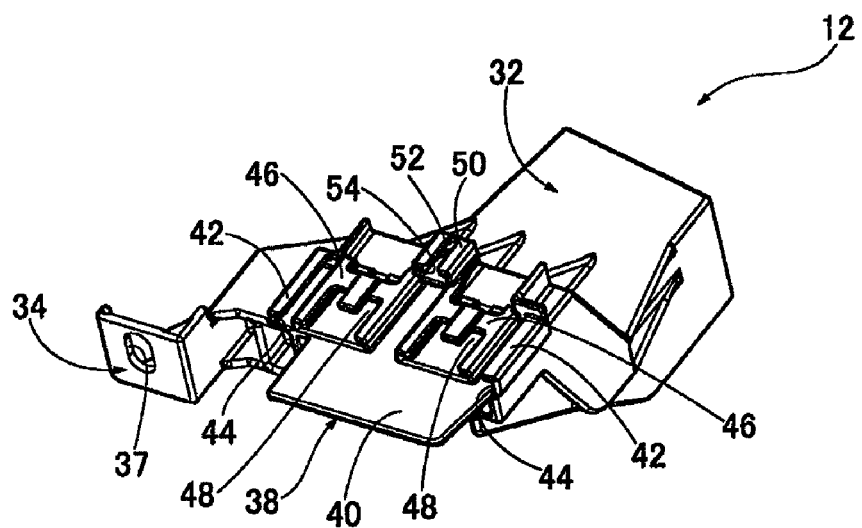
FIG. 5 is a perspective view of the bracket that constitutes the electrical junction box shown in FIG. 1, illustrating the bracket taken from another angle in FIG. 4.

That is, it will be apparent from FIGS. 4 and 5 that the bracket body 32 of the bracket 12 is integrally provided on a lower end part with an attaching plate portion 38 that extends in an upper and lower direction. The attaching plate portion 38 includes an attaching surface 40 having a substantially rectangular shape on one surface in a thickness direction. The attaching surface 40 is provided with an integrated guide portion 42 on opposite ends in a width direction perpendicular to the upper and lower direction. Two guide portions 42 are open toward the inside of the attaching surface 40 in the width direction and each portion 42 is provided with a guide groove 44 extending in the upper and lower direction.

A first tubular receiving portion 46 is integrally provided on each of opposite ends across a central part in the width direction of the attaching surface 40 disposed between the two guide portions 42 and 42. Each first tubular receiving portion 46 is formed into a flat and wide square tubular shape that is open in the upper and lower direction. Two inserting spaces 48 and 48 each having a flat inner aperture extend in the upper and lower direction at the opposite sides across the central part of the attaching surface 40 in the width direction.

Furthermore, the attaching surface 40 is integrally provided with a second tubular receiving portion 50 on the central part in the width direction above the two first tubular receiving portions 46 and 46. The second tubular receiving portion 50 is open only to a lower end and is formed into a flat tubular shape with a bottom. The second tubular receiving portion 50 is narrower than the first tubular receiving portions 40. The second tubular receiving portion 50 is provided on a wide tubular wall portion at a projecting side with a slit 52 extending over an entire length in the upper and lower direction. The second tubular receiving portion 50 is fixed on the attaching surface 40 on the wide tubular wall portion at the opposite side from the slit 52. Thus, a fitting recess 54 including a flat inner aperture in the second tubular receiving portion 50 extends in the upper and lower direction and is open downward at the central position in the width direction of the upper end of the attaching surface 40.

On the other hand, as shown in FIGS. 1 to 3, a first peripheral portion 30a and a second peripheral portion 30b that extend in a longitudinal direction are provided on their outer surfaces with a first engagement body 56 and a second engagement body 58 on the peripheral wall portion 30 of the outer casing 16 of the electrical junction box body 11. These first and second engagement bodies 56 and 58 are disposed on longitudinal opposite ends of the first and second peripheral wall portions 30a and 30b.

The first engagement body 56 has an engagement plate portion 60. The engagement plate portion 60 is formed into a flat plate-like shape that extends in the longitudinal direction of the first and second peripheral wall portions 30a and 30b. The engagement plate portion 60 is spaced apart from and is opposed to the outer surfaces of the first and second peripheral wall portions 30a and 30b by a given distance. The engagement plate portion 60 is integrally coupled to the first and second peripheral wall portions 30a and 30b through end coupling portions 62 and 62 at opposite ends of the longitudinal direction and an intermediate coupling portion 64 at an intermediate part.

The engagement plate portion 60 is provided with a slit-like elongated groove 66 inside the end coupling portions 62, 62 and in opposite sides of the intermediate coupling portion 64, respectively. Each groove 66 extends straightly from an upper side surface of the engagement plate portion 60 near to a central part in the upper and lower direction. Hereinafter, four grooves 66 are designated as a first groove 66a, a second groove 66b, a third groove 66c, and a fourth groove 66d in order from the front side to the rear side.

Thus, the engagement plate portion 60 is provided on a part between the first and second grooves 66a and 66b with a first engagement lock portion 68 while the engagement plate portion 60 is provided on a part between the third and fourth grooves 66c and 66d with a second engagement lock portion 70. These first and second engagement lock portions 68 and 70 are formed into the same lip-like shapes each including a flat plate extending in the upper and lower direction. The first and second engagement lock portions 68 and 70 are arranged so that they approach each other adequately in the longitudinal direction of the first and second peripheral wall portions 30a and 30b.

The engagement plate portion 60 of the first engagement body 56 is integrally provided on the longitudinally opposite ends with a sliding projection 72 that protrudes from the respective end coupling portions 62 toward the side direction and extends in the upper and lower direction by a given length. Furthermore, the first and second peripheral wall portions 30a and 30b opposed to the engagement plate portion 60 of the first engagement body 56 are provided with two fitting portions 74 extending in the upper and lower direction, respectively. Each fitting portion 74 is provided in an inner side with a T-shaped groove in cross section.

The second engagement body 58 has the same basic construction as that of the first engagement body 56 except that the second engagement body 58 is connected to the outer surfaces of the first and second peripheral wall portions 30a and 30b by only two end coupling portions 62 and 62 and that the engagement plate portion 60 is provided with a single engagement lock portion.

On the other hand, as shown in FIG. 3, the inner casing 14 of the electrical junction box body 11 is integrally provided on the bottom wall section 18 with a fitting projection portion 76. The fitting projection portion 76 is formed into a T-shape in cross section, as a whole, and includes a wide and flat plate-like head portion 78 and a narrow width leg portion 80 integrated with the head portion 78.

The head portion 78 is disposed immediately above the intermediate coupling portion 64 of the first engagement body 56 provided on the first peripheral wall portion 30a of the outer casing 16. The head portion 78 is opposed to an outward exposed proximal end of the peripheral wall portion 20a of the inner casing 14 to be superimposed on the first peripheral wall portion 30a of the outer casing 16 and is opposed to the outer peripheral corner portion 21 formed between the peripheral wall portion 20a and the bottom wall section 18. The head portion 78 extends on that position in the upper and lower direction that is the direction of fitting the inner and outer casings 14 and 16 to each other. The leg portion 80 is integrated with and extends from a central part in the width direction on a surface opposed to the peripheral wall portion 20a of the head portion 78 and to the outer peripheral corner portion 21. The leg portion 80 is integrally coupled to the outer peripheral wall corner portion 21 and to a tubular wall surface of the receiving tubular portion 22 that serves as a reinforcing rib and is integrally provided on the bottom wall section 18. Thus, the fitting projection 76 is integrally provided on the bottom wall section 18 of the inner casing 14. The fitting projection 76 constructed above is disposed immediately above a position between the first and second engagement lock portions 68 and 70 provided on the peripheral wall portion 30a of the outer casing 16. A part of the head portion 78 projects from the outer surface of the peripheral wall portion 20 of the inner casing 14. A length of the head portion 78 is advantageously elongated in the upper and lower direction. A coupling strength of the leg portion 80 and further of the inner casing 14 to the fitting projection 76 can be effectively enhanced.

A plurality of engagement ribs 82 are integrally provided on the respective outer surfaces of the opposed peripheral wall portions 20a and 20b of the inner casing 14. Each engagement rib 82 is formed into a T-shape in cross section so that the rib 82 can be fitted in the T-shaped grooves in cross section that are provided in the first and second peripheral wall portions 30a and 30b of the outer casing 16.

Figure 6:
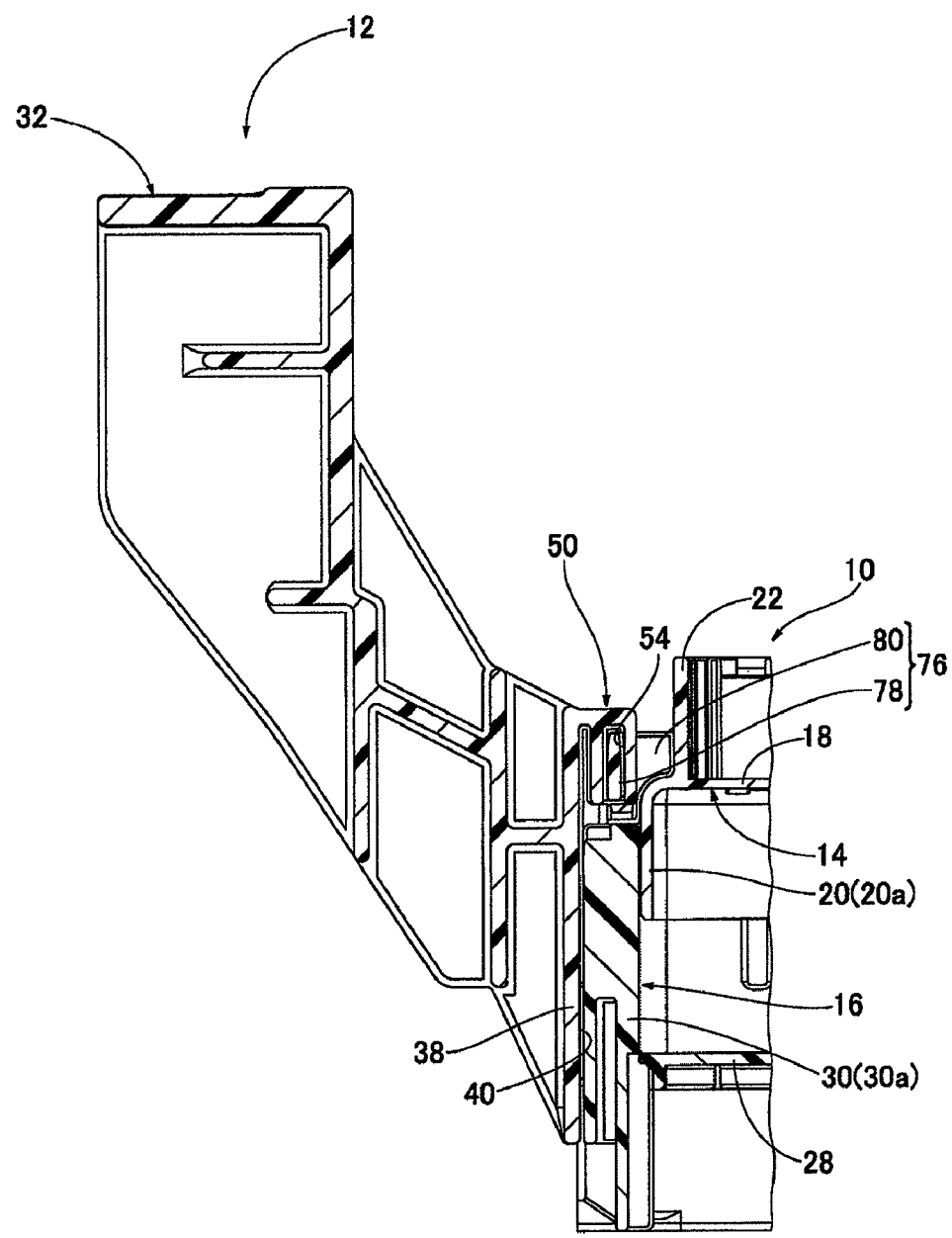
FIG. 6 is a partially enlarged cross section view of the electrical junction box taken along lines VI-VI in FIG. 2.

As shown in FIGS. 2 and 6, the first and second engagement lock portions 68 and 70 of the first engagement body 56 provided on the first peripheral wall portion 30a of the outer casing 16 are inserted upward into the respective spaces 48 and 48 in the two first tubular receiving portions 46 and 46 of the bracket 12. At this time, the two sliding projections 72 and 72 provided on the first peripheral wall portion 30a of the outer casing 16 are fitted in the respective guide grooves 44 in the guide portions 42 provided on the attaching surface 40 of the bracket 12. Thus, the two first tubular receiving portions 46 and 46 of the bracket 12 are engaged with the first and second engagement lock portions 68 and 70 through the opening defined by the peripheral wall portion 30 of the outer casing 16, thereby securing the bracket 12 to the outer casing 16.

Under this condition, the head portion 78 of the fitting projection portion 76 provided on the inner casing 14 is inserted into the fitting recess 54 of the second tubular receiving portion 50 of the bracket 12 while the leg portion 80 of the fitting projection 76 is inserted into the slit 52 in the second tubular receiving portion 50. Thus, when the respective tubular receiving portions 46 of the bracket 12 are engaged with the peripheral wall portion 30 of the outer casing 16, the fitting projection portions 76 are fitted in the fitting recesses 54 of the second tubular receiving portion 50 of the bracket 12. On the other hand, the bracket 12 is secured to the inner casing 14 with the bracket 12 being restrained from moving outward from the peripheral wall portion 20a. When the fitting projection portions 76 are fitted in the fitting recesses 54, the fitting projection portions 76 contact with the inner surface of the second tubular receiving portion 50, thereby restraining the bracket 12 from moving downward from the contacting position.

Thus, the bracket 12 is attached to the electrical junction box body 11 with the bracket 12 being secured to the outer and inner casings 16 and 14. Under this condition, the T-shaped plural engagement ribs 82 in cross section provided on the outer surfaces of the peripheral wall portions 20a and 20b of the inner casing 14 are inserted into and engaged with the T-shaped grooves in the plural fitting portions 74 provided on the first and second peripheral wall portions 30a and 30b of the outer casing 16. Furthermore, although it is not shown in the drawings, brackets different from the bracket 12 and various kinds of members except the brackets are engaged with and secured to the second engagement body 58 provided on the first peripheral wall portion 30a of the outer casing 16 and the first and second engagement bodies 56 and 58 provided on the second peripheral wall portion 30a of the outer casing 16.

Thus, in the embodiment of the electrical junction box 10, the bracket 12 is attached to the electrical junction box body 11 with the bracket 12 being secured to the outer and inner casings 16 and 14. Accordingly, an attaching force of the bracket 12 to the electrical junction box body 11 is set to be sufficiently greater than, for example, a conventional product in which the bracket 12 is secured to only the outer casing 16. Also, even if a great external force is applied to the bracket 12 in a direction in which the bracket 12 is removed from the electrical junction box body 11 toward the side part, a stress is dispersed into the first peripheral wall portion 30a of the outer casing 16 and the peripheral wall portion 20a of the inner casing 14. Accordingly, it is possible to prevent the first peripheral wall portion 30a of the outer casing 16 from being deformed so as to be removed from the peripheral wall portion 20a of the inner casing 14 and so as to be bulged outward (lifted upward) by the external force. Consequently, it is possible to effectively prevent the first peripheral wall portion 30a of the outer casing 16 from being broken by the deformation, to prevent the bracket 12 from being loosened at the attaching portion on the electrical junction box body 11 by the deformation, to prevent the assembling condition between the inner and outer casings 14 and 16 constituting the electrical junction box body 11 from being unstable by the deformation, and to prevent internal circuits from being affected by the deformation. Also, in the present embodiment, it is possible to advantageously prevent the first peripheral wall portion 30a of the outer casing 16 from being lifted from the peripheral portion 20a of the inner casing 14 even by engagement between the engagement ribs 82 of the inner casing 14 and the grooves in the fitting portions 74 of the outer casing 16.

Also, in the present embodiment, the first and second engagement lock portions 68 and 70 are approached to each other on the first peripheral wall portion 30a of the outer casing 16. Thus, it is possible to sufficiently reduce forming spaces of the first and second engagement lock portions 68 and 70 on the outer casing 16. It is further possible to attach the bracket 12 to the electrical junction box body 11 more stably and with an adequate strength.

Furthermore, the fitting projection portions 76 are provided on the peripheral wall portion 20a of the inner casing 14 in association with a small space between the first and second engagement lock portions 68 and 70. Accordingly, it is possible to prevent the first peripheral wall portion 30a of the outer casing 16 from being lifted from the peripheral wall portion 20a of the inner casing 14 and it is possible to increase a strength of attaching the bracket 12 to the outer casing 16 by effectively utilizing a very small space.

Also, the fitting projection portions 76 are attached to the inner casing 14 with a high strength. In addition, the head portion 78 of each fitting projection portion 76 has an adequate length in the upper and lower direction. Thus, it is possible to attach the bracket 12 to the electrical junction box body 11 as well as the inner casing 14 with a higher strength.

Furthermore, the assembling direction between the inner and outer casings 14 and 16, the engaging direction between the first and second engagement lock portions 68, 70 and the first tubular receiving portion 46 of the bracket 12, and the fitting direction between the fitting projection portions 76 and the fitting recesses 54 in the second tubular receiving portion 50 of the bracket 12 are set to be same among one another. Consequently, it is possible to carry out, for example, a forming operation of the electrical junction box body 11 upon assembling the inner and outer casings 14 and 16 and an attaching operation of the bracket 12 to the electrical junction box 12 at a single stroke, thereby advantageously simplifying the forming operation of the electrical junction box 10.

Although the embodiment of the present invention is described above in detail, it should be noted that the present invention is not limited to the embodiment detailed above. For example, an attaching position, an attaching number, or the like in which the bracket 12 is attached to the electrical junction box body 11 may be altered as appropriate in accordance with a configuration, a size, or the like of the electrical junction box body 11.

In the above embodiment, two engagement lock portions 68 and 70 are disposed adjacent to each other in the peripheral direction on the peripheral wall 30 of the outer casing 16. The fitting projection portions 76 are provided between the two engagement portions 68 and 70 on the bottom wall section 18 of the inner casing 14 exposed from the opening defined by the peripheral wall portion 30. However, a single fitting projection portion may be provided on a single engagement lock portion in accordance with an arrangement space of the engagement lock portion, a supporting strength of a required bracket, or the like. For example, a single engagement lock portion may be provided on the peripheral wall portion 30 and a single fitting projection may be disposed near the engagement lock portion, for example, immediately or slant above the engagement lock portion. The present invention includes these constructions.

Furthermore, taking into a consideration of strengths of the outer casing 16 and inner casing 14, a vacant space, and the like, a plurality of fitting projection portions may be provided on a single engagement lock portion, the fitting recess in the bracket 12 may be engaged with the plural fitting projection portions in association with engagement of the bracket 12 with the engagement lock portion. In addition, more than two engagement lock portions may be provided adjacent to one another in the peripheral direction and at least one fitting projection may be provided near the plural engagement lock portions. The present invention includes these constructions.

Also, in the above embodiment, the two engagement lock portions 68 and 70 include the two lip-like plates provided on the first peripheral wall portion 30a of the outer casing 16, the respective engagement lock portions 68 and 70 are inserted into and engaged with the inserting spaces 48 and 48 in the first tubular receiving portions 46 provided on the bracket 12. Alternatively, two first tubular receiving portions 46 and 46 may be provided on the first peripheral portion 30a of the outer casing 16 as two engagement lock portions while two engagement portions each including a lip-like flat plate may be provided on the bracket 12. The respective engagement portions may be engaged with the respective first tubular receiving portions that serve as engagement lock portions and the bracket 12 may be secured to the outer casing 16. Publicly known various kinds of constructions can be suitably applied to a detailed construction of the engagement lock portion and an engagement construction between the engagement lock portion and the bracket.

Also, as the fitting projection portions, the second tubular receiving portion 50 projects from the bottom wall section 18 of the inner casing 14 while the T-shaped engagement portion having the head portion 78 and leg portion 80 is integrally formed on the bracket 12. It is also possible to secure the bracket 12 to the inner casing 14 by mating the engagement portion with the second tubular receiving portion 50. At this time, the second tubular receiving portion 50 is formed into a tubular configuration that is open upward and is provided on one end with a bottom. The fitting projection portion and fitting recess are not limited to detailed configurations so long as the bracket 12 is restrained from moving outward from the inner casing 14 that serves as the other casing upon mating the fitting projection portion and fitting recess. Publicly known structures can be suitably applied to the fitting projection portion and fitting recess.

What is claimed is:

1. An electrical junction box having a first casing superimposed on a second casing, the first casing being fitted in a peripheral wall portion of the second casing to form an electrical junction box body, said electrical junction box comprising:
    an engagement lock portion provided on an outer surface of the peripheral wall portion of the second casing; and
    a bracket attached to said engagement lock portion from a side of an opening defined by the peripheral wall portion;
    wherein a fitting projection portion extends from a bottom wall section of the first casing to an outer peripheral surface adjacent said engagement lock portion; and
    said bracket is provided with a fitting recess in which said fitting projection portion is fitted during coupling of said bracket to said engagement lock portion in order to restrain said bracket from moving outward from said first casing;
    wherein said fitting projection portion includes a narrow width leg portion and a wide width head portion at an end of said leg portion, said wide width head portion extending in a fitting direction of said fitting recess of said bracket, and said narrow width leg portion extending from an outer peripheral corner portion of the bottom wall section of the first casing to a bottom surface of the bottom wall section.

2. The electrical junction box according to claim 1, wherein the bottom wall section is provided on the bottom surface with a reinforcing rib and said narrow width leg portion of said fitting projection portion is connected to said reinforcing rib.

3. An electrical junction box having a first casing superimposed on a second casing, the first casing being fitted in a peripheral wall portion of the second casing to form an electrical junction box body, said electrical junction box comprising:
    an engagement lock portion provided on an outer surface of the peripheral wall portion of the second casing; and
    a bracket attached to said engagement lock portion from a side of an opening defined by the peripheral wall portion;

wherein a fitting projection portion extends from a bottom wall section of the first casing to an outer peripheral surface adjacent said engagement lock portion; and said bracket is provided with a fitting recess in which said fitting projection portion is fitted during coupling of said bracket to said engagement lock portion in order to restrain said bracket from moving outward from said first casing;

wherein said engagement lock portion includes two adjacent engagement lock parts spaced laterally on the outer surface of the peripheral wall portion of the second casing, and said fitting projection portion is disposed on a portion corresponding to between said two engagement lock parts;

wherein said fitting projection portion includes a narrow width leg portion and a wide width head portion at an end of said leg portion, said wide width head portion extending in a fitting direction of said fitting recess of said bracket, and said narrow width leg portion extending from an outer peripheral corner portion of the bottom wall section of the first casing to a bottom surface of the bottom wall section.

4. The electrical junction box according to claim 3, wherein the bottom wall section is provided on the bottom surface with a reinforcing rib and said narrow width leg portion of said fitting projection portion is connected to said reinforcing rib.

* * * * *